(12) United States Patent
Araki et al.

(10) Patent No.: US 11,973,914 B2
(45) Date of Patent: Apr. 30, 2024

(54) IMAGE FORMING APPARATUS CONFIGURED TO PERFORM HALFTONE PROCESSING

(71) Applicant: CANON KABUSHIKI KAISHA, Tokyo (JP)

(72) Inventors: Go Araki, Shizuoka (JP); Mitsuhiro Obara, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/159,142

(22) Filed: Jan. 25, 2023

(65) Prior Publication Data

US 2023/0269340 A1 Aug. 24, 2023

(30) Foreign Application Priority Data

Feb. 18, 2022 (JP) ................................. 2022-024020

(51) Int. Cl.
*H04N 1/405* (2006.01)
*G03G 15/043* (2006.01)
*H04N 1/29* (2006.01)
*H04N 1/52* (2006.01)
*H04N 1/053* (2006.01)
*H04N 1/193* (2006.01)

(52) U.S. Cl.
CPC ......... *H04N 1/4052* (2013.01); *G03G 15/043* (2013.01); *H04N 1/295* (2013.01); *H04N 1/52* (2013.01); *H04N 1/053* (2013.01); *H04N 1/1933* (2013.01)

(58) Field of Classification Search
USPC ........................................................ 358/1.7
See application file for complete search history.

(56) References Cited

U.S. PATENT DOCUMENTS

| 9,645,521 | B2 | 5/2017 | Kodama | |
|---|---|---|---|---|
| 2010/0091342 | A1* | 4/2010 | Nakamura | H04N 1/053 358/474 |
| 2013/0141510 | A1* | 6/2013 | Araki | G02B 26/124 347/224 |

FOREIGN PATENT DOCUMENTS

| JP | 2013117699 A | 6/2013 |
|---|---|---|
| JP | 2015221548 A | 12/2015 |
| JP | 2018008485 A | 1/2018 |

* cited by examiner

*Primary Examiner* — Jacky X Zheng
(74) *Attorney, Agent, or Firm* — ROSSI, KIMMS & McDOWELL LLP

(57) ABSTRACT

An image forming apparatus includes: a scanning unit configured to form an electrostatic latent image on a photoconductor by scanning the photoconductor with one or more scanning beams in a main scanning direction based on an image signal, repetitively in a sub-scanning direction perpendicular to the main scanning direction; a generating unit configured to perform halftone processing on image data to generate the image signal; and a storage unit configured to store correction information. The correction information is set such that start positions of a plurality of scanning lines are linearly displaced to either a negative side or a positive side of the main scanning direction along the sub-scanning direction, in accordance with a direction of a first vector forming a smaller angle with the sub-scanning direction among two vectors in the halftone processing.

7 Claims, 16 Drawing Sheets

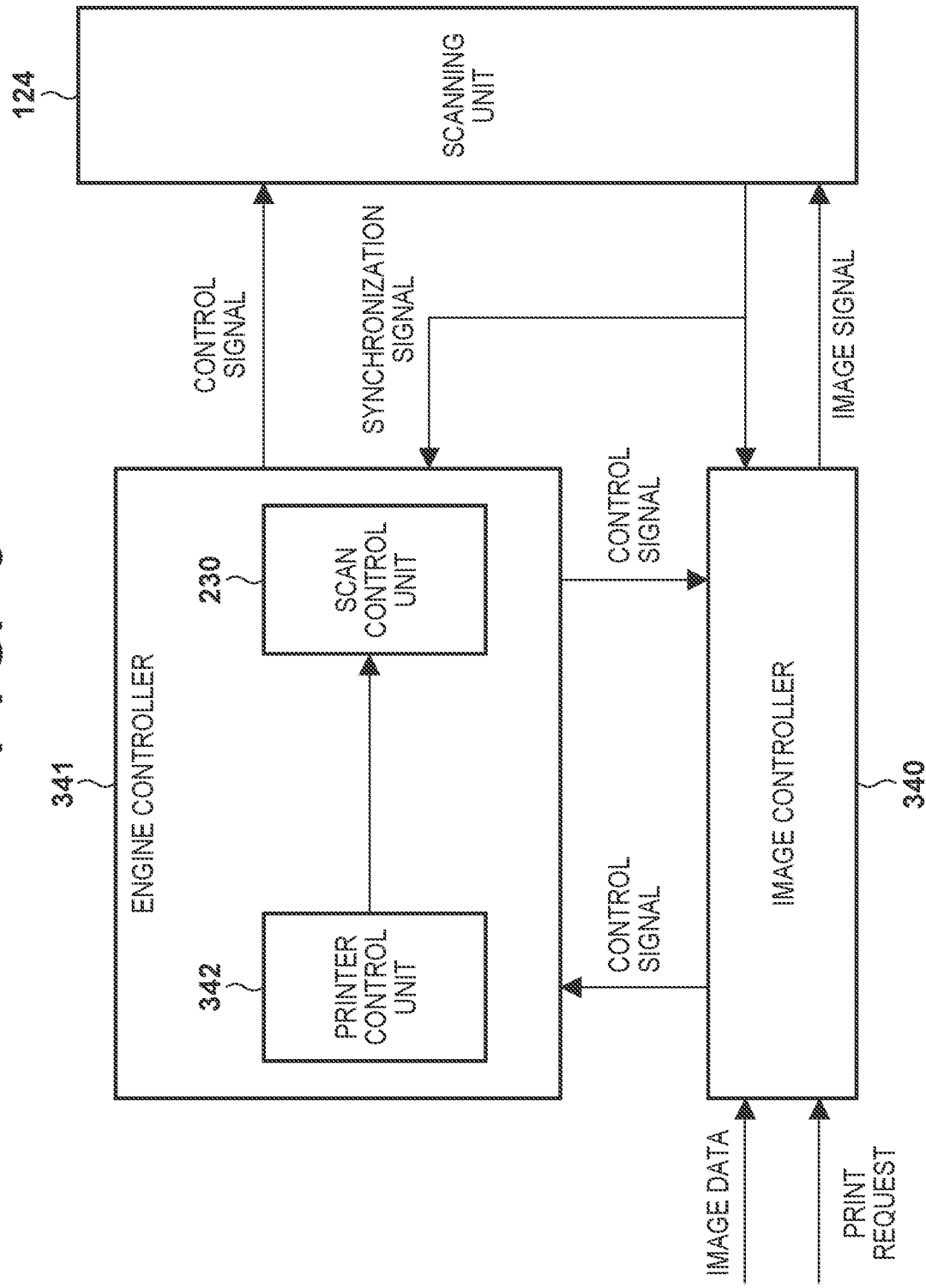

FIG. 10A

| SCANNING LINE | START TIMING | INSERTION OR REMOVAL AMOUNT |
|---|---|---|
| SCANNING LINE #1 | 0 | 0 |
| SCANNING LINE #2 | 0 | 0 |
| SCANNING LINE #3 | +4 PULSE | 0 |
| SCANNING LINE #4 | +4 PULSE | 0 |

FIG. 10B

| SCANNING LINE | START TIMING | INSERTION OR REMOVAL AMOUNT |
|---|---|---|
| SCANNING LINE #1 | 0 | +4 |
| SCANNING LINE #2 | 0 | +4 |
| SCANNING LINE #3 | 0 | −4 |
| SCANNING LINE #4 | 0 | −4 |

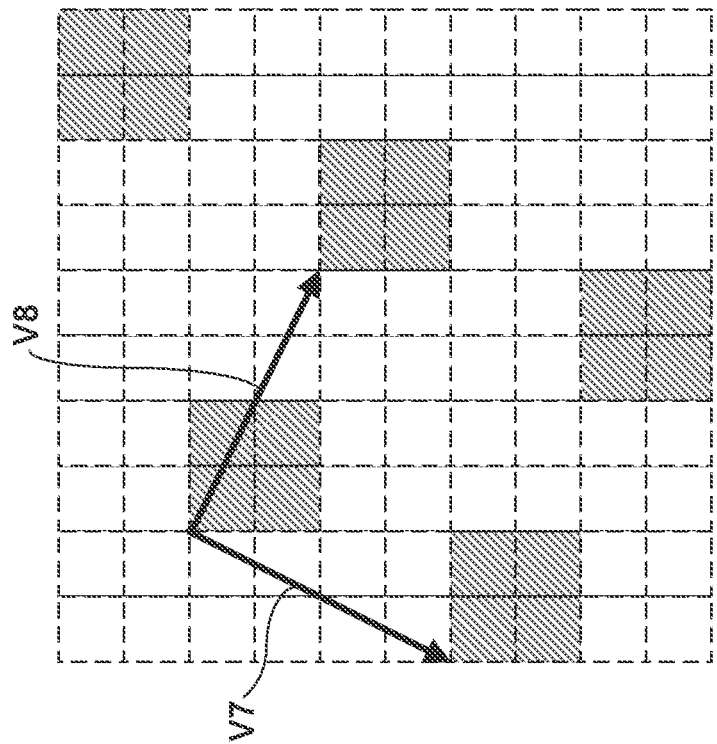
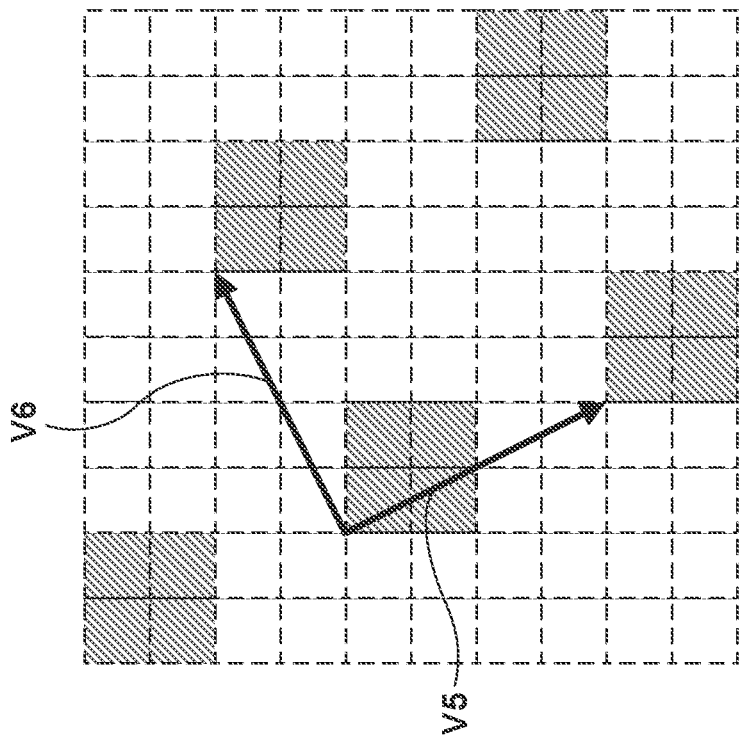

– 1 –
IMAGE FORMING APPARATUS CONFIGURED TO PERFORM HALFTONE PROCESSING

BACKGROUND OF THE INVENTION

Field of the Invention

The present invention relates to an image forming apparatus such as a laser beam printer, a digital copying machine, or digital facsimile machine, for example.

Description of the Related Art

An electrophotographic image forming apparatus repeatedly scans a rotationally driven photoconductor with a scanning beam based on image data to form an electrostatic latent image on the photoconductor, and develops the electrostatic latent image with toner to form an image. Here, a trajectory of a scanning beam that has moved across the photoconductor during a single scan in order to form an electrostatic latent image is referred to as a scanning line, and the direction of movement of the scanning beam is referred to as a main scanning direction. In addition, a direction, which is perpendicular to the main scanning direction, and in which the scanning lines are sequentially formed, is referred to as a sub-scanning direction. Here, the main scanning direction is parallel to the rotational axis of the photoconductor. In addition, a direction in the photoconductor opposite to the rotation direction of the photoconductor corresponds to the sub-scanning direction at the photoconductor.

A rotating polygonal mirror is used for moving the scanning beam in the main scanning direction on the photoconductor. Here, when the length of each scanning lines and its position in the main scanning direction periodically varies in the sub-scanning direction, moire may appear in the image due to interference with the period of the halftone processing. The periodic variation of the scanning lines in the sub-scanning direction may occur due to manufacturing error or the like in each reflecting surface of the rotating polygonal mirror. In a configuration that uses a plurality of scanning beams emitted from a plurality of light sources to scan the photoconductor, a periodic variation in the sub-scanning direction of the scanning lines may occur due to arrangement error or the like of the plurality of light sources.

US-2013-141510 discloses a configuration in which an error of the length of each of the scanning lines for each reflecting surface is measured in order to align the lengths of scanning lines generated by scanning beams reflected at respective reflecting surfaces of the rotating polygonal mirror, and a pixel piece acquired by dividing a pixel is inserted and removed to correct the error.

Moire can be reduced by a correction to suppress the periodic variation in the sub-scanning direction of the scanning lines, based on the result of a preliminarily performed measurement. However, existence of a measurement error may cause a periodic variation in the sub-scanning direction of the scanning lines, which may lead to an insufficient reduction of moire.

SUMMARY OF THE INVENTION

According to an aspect of the present invention, an image forming apparatus includes: a photoconductor; a scanning unit configured to form an electrostatic latent image on the photoconductor by scanning the photoconductor with one or more scanning beams in a main scanning direction based on an image signal, repetitively in a sub-scanning direction perpendicular to the main scanning direction; a generating unit configured to perform halftone processing on image data to generate the image signal; and a storage unit configured to store correction information for correcting a scanning start position of the one or more scanning beams for the photoconductor, wherein the correction information is set such that scanning start positions of a plurality of scanning lines that are successive in the sub-scanning direction formed on the photoconductor by the one or more scanning beams are linearly displaced to either a negative side or a positive side of the main scanning direction along the sub-scanning direction, in accordance with a direction of a first vector forming a smaller angle with the sub-scanning direction among two vectors in the halftone processing.

Further features of the present invention will become apparent from the following description of exemplary embodiments with reference to the attached drawings.

BRIEF DESCRIPTION OF THE DRAWINGS

FIG. 3 is a control configuration diagram of an image forming apparatus according to one embodiment;

FIGS. 10A and 10B are diagrams illustrating correction information according to an embodiment;

FIGS. 15A and 15B are diagrams illustrating an image formed by halftone processing according to an embodiment;

DESCRIPTION OF THE EMBODIMENTS

Figure 1:
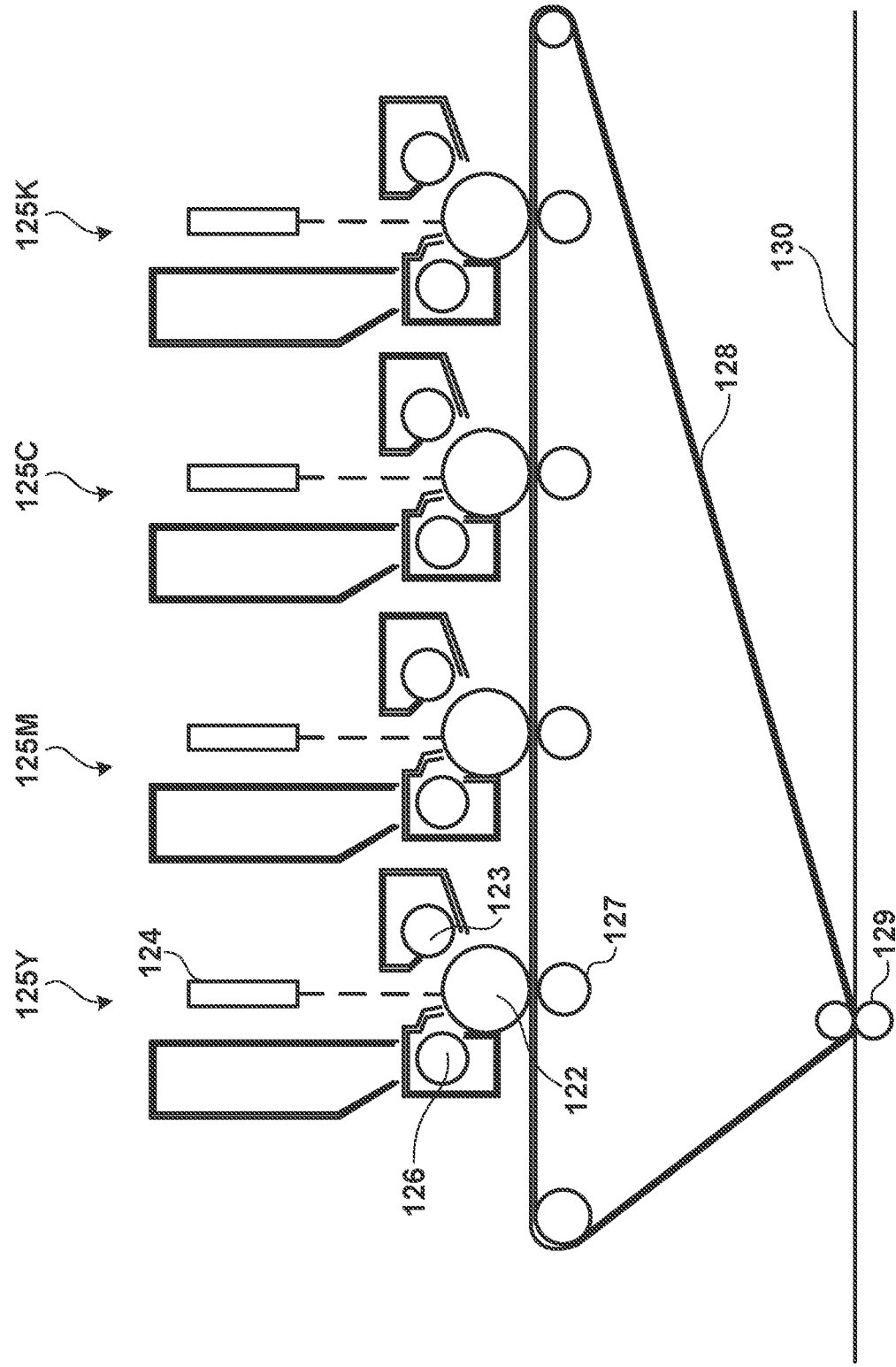
FIG. 1 is a schematic configuration diagram of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic configuration diagram of an image forming apparatus according to the present embodiment. In the following drawings, components that are not necessary for understanding the embodiment are omitted for simplicity. Image forming units 125Y, 125M, 125C and 125K respectively form yellow, magenta, cyan and black toner images on an intermediate transfer member 128. Here, forming the toner images on the intermediate transfer member 128 in an overlapping manner by each of the image forming units 125Y, 125M, 125C and 125K allows for reproducing different colors from yellow, magenta, cyan and black. Each of the image forming units 125Y, 125M, 125C, and 125K, being configured in a similar manner, includes a photoconductor 122, a charging roller 123, a scanning unit 124, a developing roller 126, and a primary transfer roller 127. In the following description, the image forming units 125Y, 125M, 125C, and 125K will also be collectively referred to as an image forming unit 125.

The photoconductor 122 is rotationally driven in a counterclockwise direction in the drawing in image formation. The charging roller 123 charges the surface of the photoconductor 122, which is rotating, to a uniform electric potential. The scanning unit 124 forms an electrostatic latent image on the photoconductor 122 by repeatedly scanning the photoconductor 122, which is rotating, in a main scanning direction with a scanning beam based on the image data. Here, the main scanning direction is parallel to the rotational axis of the photoconductor 122 and is a direction in which the scanning beam moves. In addition, a direction, which is perpendicular to the main scanning direction, and in which the scanning lines are sequentially formed, is a sub-scanning direction. In the photoconductor 122, a direction opposite to the rotational direction of the photoconductor 122 corresponds to the sub-scanning direction. The developing roller 126 develops an electrostatic latent image on the photoconductor 122 with toner to form a toner image on the photoconductor 122. The primary transfer roller 127 transfers the toner image formed on the photoconductor 122 to the intermediate transfer member 128. The intermediate transfer member 128 is rotationally driven in a clockwise direction in the drawing in image formation. The toner image on the intermediate transfer member 128 is therefore conveyed to an opposite position of a secondary transfer roller 129. The secondary transfer roller 129 transfers the toner image formed on the intermediate transfer member 128 to a sheet that has been conveyed along a conveyance path 130. Subsequently, the sheet is conveyed to a fixing unit (not illustrated) where fixing of the toner image is performed. After the toner image is fixed, the sheet is discharged to the outside of the image forming apparatus.

Figure 2:
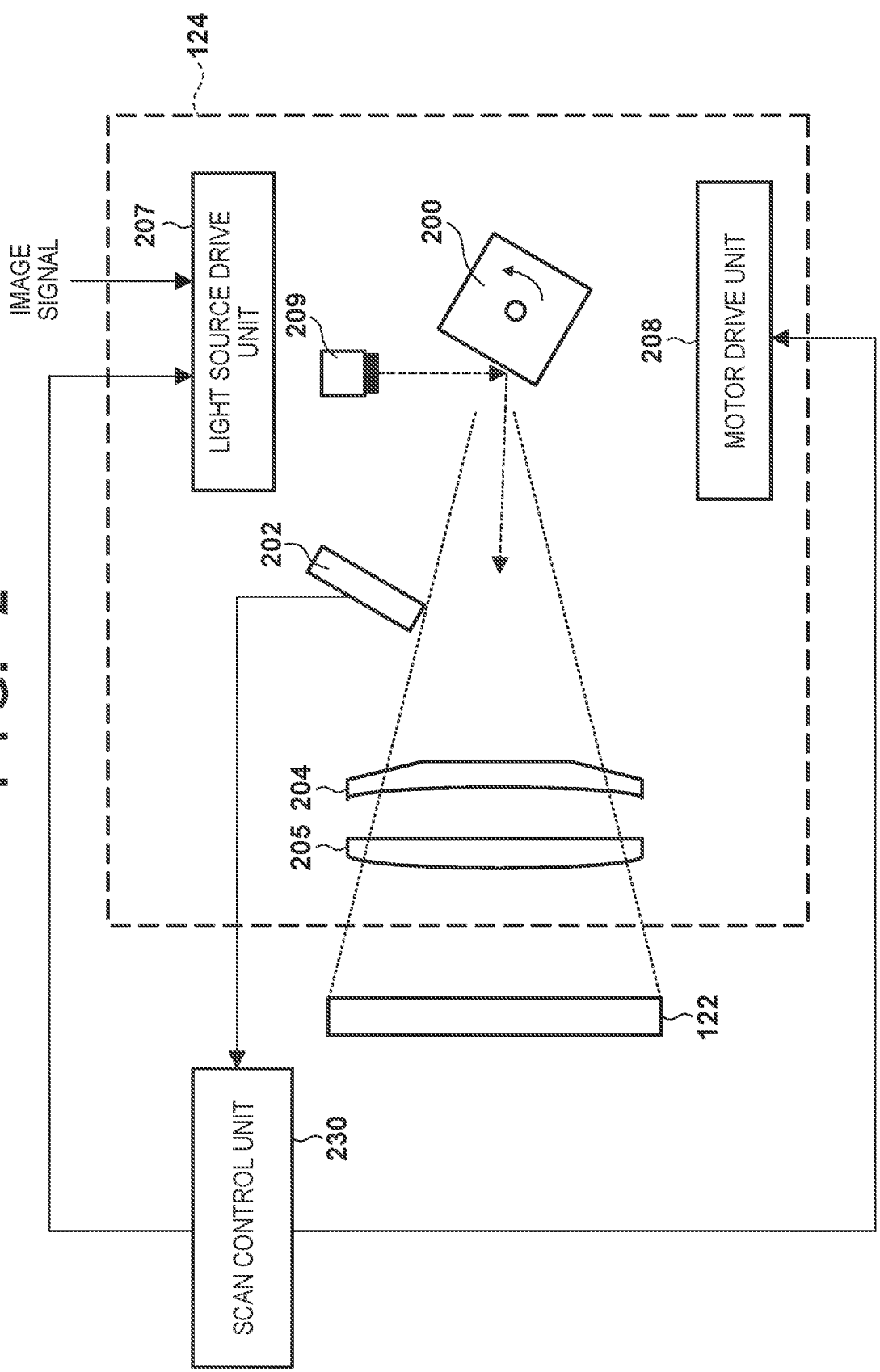
FIG. 2 is a configuration diagram of a scanning unit according to an embodiment.

FIG. 2 is a configuration diagram of the scanning unit 124. A light source drive unit 207 performs emission control of the light source 209 based on an image signal, under the control by the scan control unit 230. In addition, the motor drive unit 208 controls the rotation speed and the rotation phase of the rotating polygonal mirror 200 under the control by the scan control unit 230. A scanning beam emitted from the light source 209 is reflected and deflected to scan the photoconductor 122, by each reflecting surface of the rotating polygonal mirror 200 including a plurality of reflecting surfaces. Here, fθ lenses 204 and 205 are provided in order to set the scanning speeds over the photoconductor 122, which is for the scanning beam deflected by the rotating polygonal mirror 200, to be a constant speed. A photo sensor 202 detects scanning beams reflected in a predetermined direction by each reflecting surface of the rotating polygonal mirror 200. The timing at which the photo sensor 202 detected a scanning beam is output to the scan control unit 230 as a synchronization signal.

The scan control unit 230 determines the rotation speed and the rotation phase of the rotating polygonal mirror 200 based on the detected period of the synchronization signal from the photo sensor 202, and controls the rotation of the rotating polygonal mirror 200 such that the rotation speed and the rotation phase match target values.

Although the rotating polygonal mirror 200 includes four reflecting surfaces in the configuration illustrated in FIG. 2, it is exemplary and any number of reflecting surfaces equal to or larger than one can be used. In addition, although the photoconductor 122 is scanned with a single scanning beam emitted from a single light source 209 in the configuration illustrated in FIG. 2, the photoconductor 122 may be scanned with a plurality of scanning beams emitted from a plurality of light sources 209. Here, the plurality of scanning beams irradiate different positions on the photoconductor 122 in the sub-scanning direction. Even when a plurality of scanning beams are used, the synchronization signal is generated based on a single scanning beam.

FIG. 3 illustrates a control configuration of the entire image forming apparatus. Upon receiving image data and a print request based on the image data, an image controller 340 generates an image signal based on the image data, and transmits the image signal to the scanning unit 124. Here, the timing of outputting the image signal to the scanning unit 124 is determined based on a synchronization signal from the scanning unit 124. A printer control unit 342 of an engine controller 341 controls each member illustrated in FIG. 1 under the control by the image controller 340. The control performed by the printer control unit 342 includes control of the scanning unit 124 via the scan control unit 230.

Figure 4:
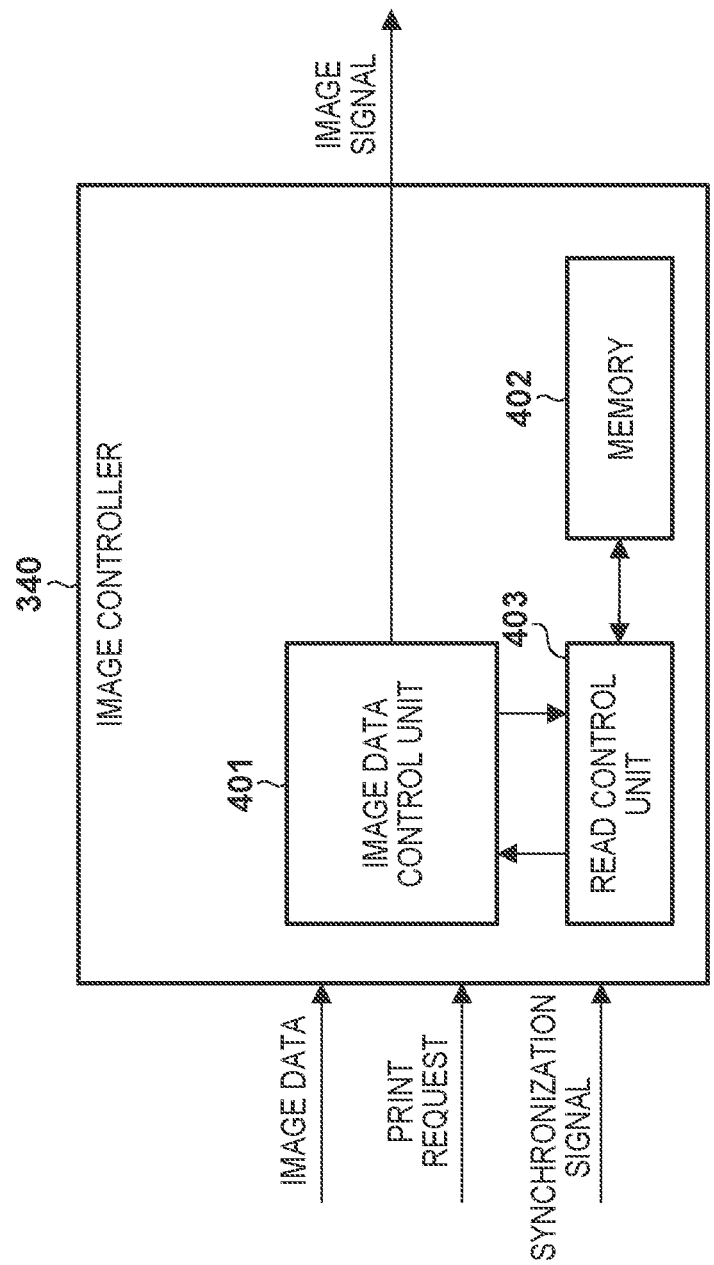
FIG. 4 is a block diagram of an image controller according to an embodiment.

FIG. 4 is a configuration diagram of the image controller 340. A memory 402 has stored therein correction information for suppressing "variation of scanning lines" of an image formed on a single sheet. The meaning of "variation of scanning lines" in the present embodiment is that the length of each scanning line is varying, or that "scanning start positions" of the scanning lines are not aligned. Furthermore, the "scanning start position" of a scanning line refers to a position in the main scanning direction on the photoconductor 122 from which formation of an electrostatic latent image by the scanning beam starts. The correction information will be described below. A read control unit 403 reads correction information stored in the memory 402. The image data control unit 401 performs various types of processing on the image data to generate a pulse width modulation (PWM) signal. Here, the various types of processing on the image data include halftone processing. The image data control unit 401 corrects the PWM signal to align the length of each of the scanning lines based on the correction information. The image data control unit 401 then adjusts, based on the correction information, the timing such that the scanning start position of each of the scanning lines on the photoconductor 122 are aligned, and subsequently outputs the corrected PWM signal to the scanning unit 124 as an image signal. The scanning unit 124 controls light emission from the light source 209 based on the PWM signal. It is assumed in the present embodiment that the light source 209 emits light in a period when the PWM signal is at a high level, or is turned off in a period when the PWM signal is at a low level. When a plurality of light sources are used, an image signal is generated for each light source and output to the scanning unit 124.

Figure 5:
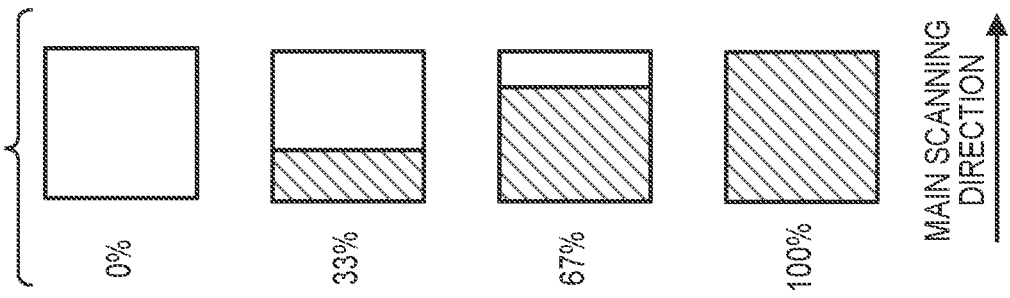
FIG. 5 is an explanatory diagram of a pixel piece.

FIG. 5 illustrates an example of exposure of a single pixel by a PWM signal. For example, in case of 600 dpi, a length (width) of one pixel in the main scanning direction is about 0.042 mm. In FIG. 5, one pixel is divided into three pixel pieces, and the pixel is exposed by each pixel piece. A single pulse of the PWM signal corresponds to a single image piece and, in the present example, the corresponding pixel piece is exposed when the pulse is at a high level, or the corresponding pixel piece is unexposed when the pulse is at a low level. In FIG. 5, a black pixel piece indicates an exposed pixel piece, and a white pixel piece indicates an unexposed pixel piece. The number at the side of each pixel indicates the percentage of the exposed area relative to the area of one pixel, which corresponds to the density. Here, the number of pixel pieces forming one pixel is not limited to three, and may be any number of two or more. In the present embodiment, a pixel piece is inserted or removed based on the correction information, in order to align the lengths of each of the scanning lines.

Figure 6A:
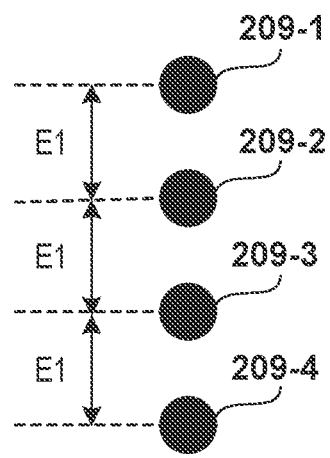
FIG. 6A is a diagram illustrating an arrangement of a plurality of light sources.

FIG. 6A illustrates an arrangement of four light sources 209-1 to 209-4 when the four light sources 209-1 to 209-4 are used. As illustrated in FIG. 6A, the four light sources 209-1 to 209-4 are arranged in a straight line with an arrangement spacing of E1. For example, E1 is about 0.03 mm. The spacing between the scanning beams emitted from the four light sources 209-1 to 209-4 arranged as illustrated in FIG. 6A is expanded to about 0.175 mm on the photoconductor 122 by the action of the fθ lenses 204 and 205. When an image is formed with 600 dpi, the spacing between the scanning lines in the sub-scanning direction is needed to be about 0.042 mm.

Figure 6B:
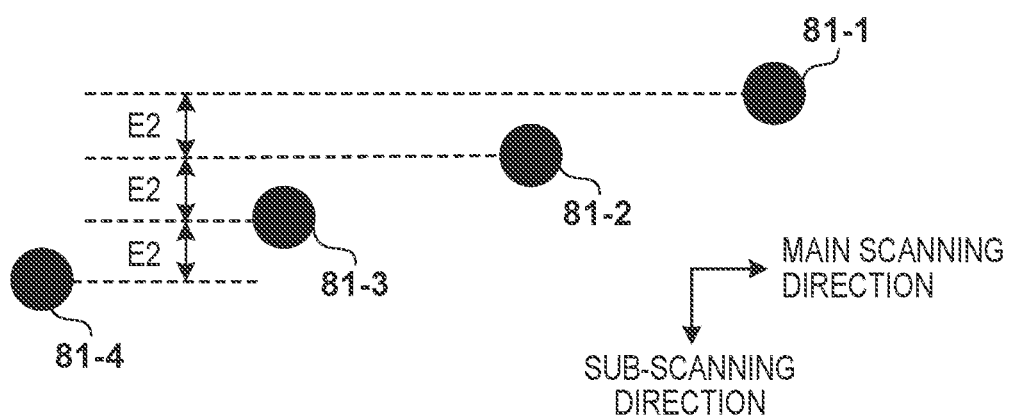
FIG. 6B is an explanatory diagram of a positional relation between scanning beams by a plurality of light sources on a photoconductor.

Accordingly, the directions of the scanning beams emitted from each of the light sources 209-1 to 209-4 are adjusted such that the spacing E2 in the sub-scanning direction on the photoconductor 122 between the scanning beams 81-1 to 81-4 emitted from the four light sources 209-1 to 209-4 becomes approximately 0.042 mm, as illustrated in FIG. 6B. In other words, the line connecting the scanning beams 81-1 to 81-4 emitted from the four light sources 209-1 to 209-4 is rotated in a direction crossing the sub-scanning direction on the photoconductor 122. Therefore, the positions in the main scanning direction of the scanning beams 81-1 to 81-4 irradiating the photoconductor 122 will be different at a certain moment. In order to align the scanning start position of each of the scanning beams 81-1 to 81-4, the timings of outputting image signals to the scanning unit 124 configured to generate the scanning beams 81-1 to 81-4 are adjusted based on the correction information, as described above.

Figure 7A:
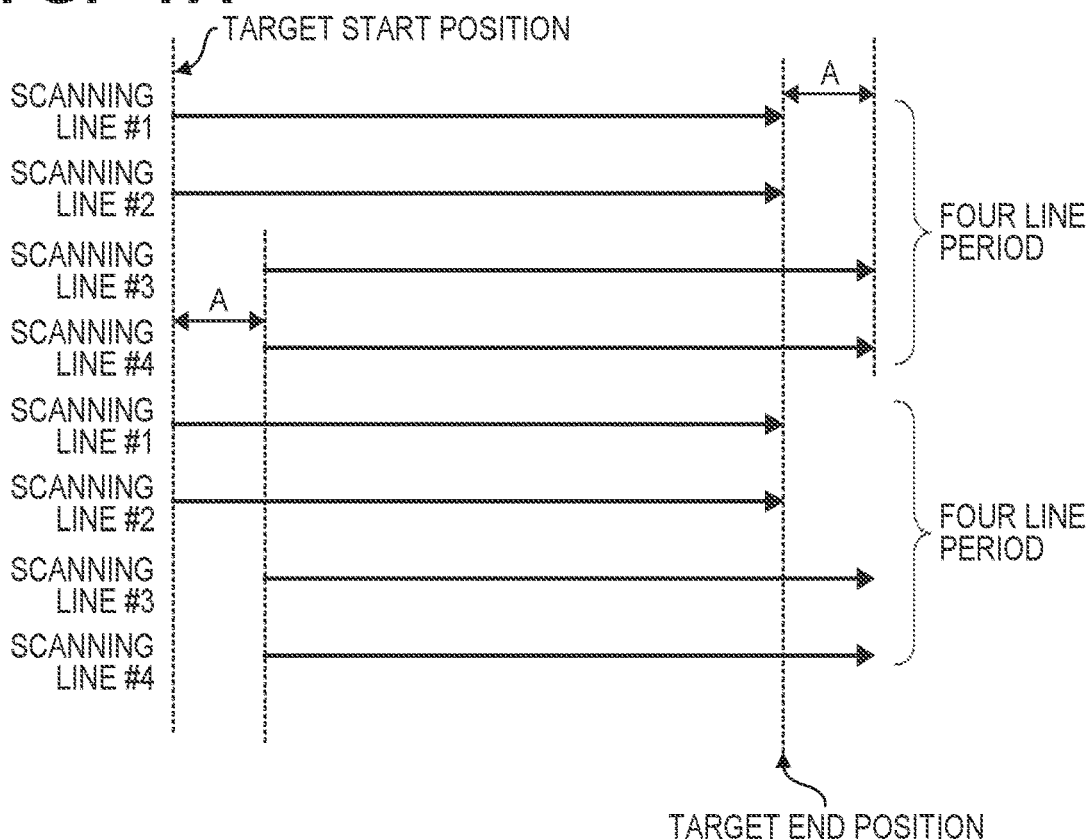
FIGS. 7A and 7B are diagrams illustrating an example of variation of scanning lines by a plurality of light sources.
Figure 7B:
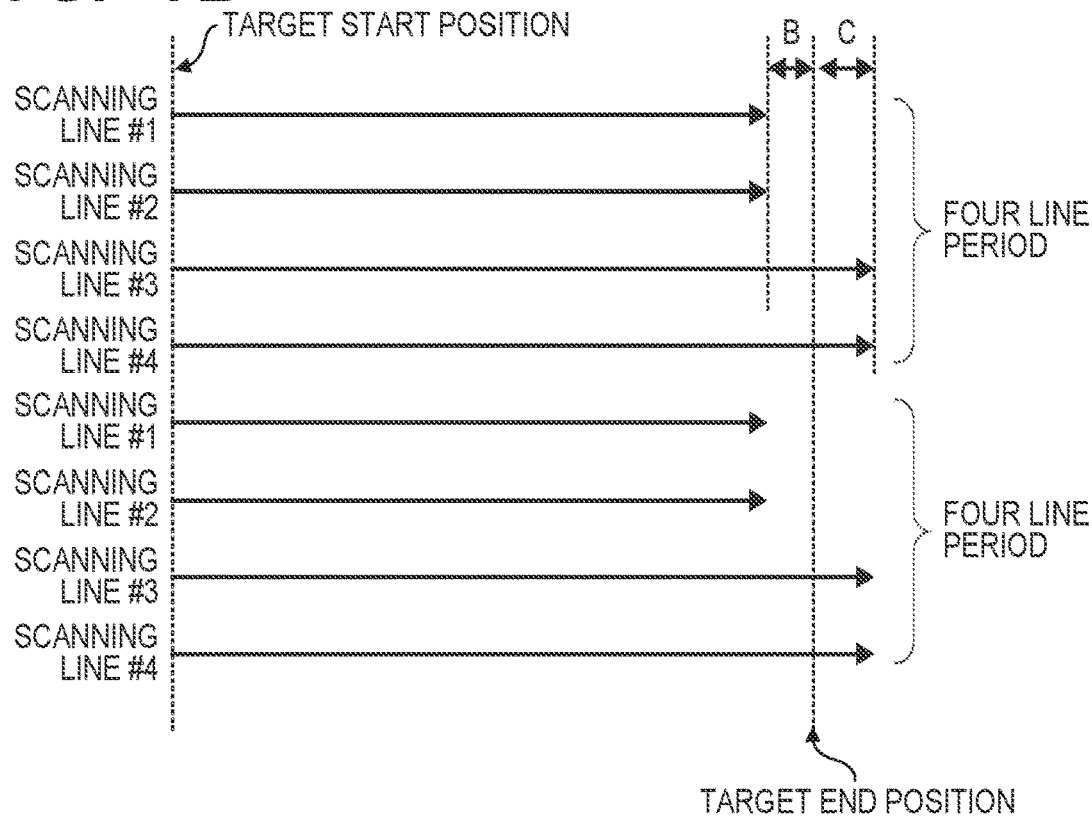

FIGS. 7A and 7B illustrate a state in which the use of correction information based on design values has caused a variation of scanning lines due to manufacturing error or the like. In FIGS. 7A and 7B, the scanning lines from the four scanning beams 81-1 to 81-4 are respectively denoted as a scanning line #1 to a scanning line #4. In FIG. 7A, although the lengths of the scanning line #1 to the scanning line #4 are equal, the scanning start positions of the scanning line #3 and the scanning line #4 has shifted to the positive side of the main scanning direction by a distance A from the target start position. Although the scanning start positions of the scanning line #1 to the scanning line #4 match the target start position in FIG. 7B, the length of the scanning line #1 and the scanning line #2 is shorter than the ideal length by a value B, and the length of the scanning line #3 and the scanning line #4 is longer than the ideal length by a value C. The target start positions illustrated in FIGS. 7A and 7B are the targeted scanning start positions, and the target end positions are positions in the main scanning direction at which electrostatic latent image formation is completed when the length of the scanning line started from the target start position is at a target value.

When four scanning beams as illustrated in FIGS. 7A and 7B are used, variation of the scanning lines in the sub-scanning direction may occur in a period of four scanning lines (four lines) equal to the number of scanning beams used. Furthermore, when the length of each of the scanning lines differs for each reflecting surface due to manufacturing error of the reflecting surface of the rotating polygonal mirror 200, variation of the scanning lines may occur in a period of number obtained with number of scanning beams multiplied by number of reflecting surfaces. In addition, when the length of each of the scanning lines differs for reflecting surface due to manufacturing error of the reflecting surface of the rotating polygonal mirror 200, variation of the scanning lines may occur in a period of number of reflecting surfaces even when a single scanning beam is used.

When the scanning lines periodically varies in the sub-scanning direction, a periodic fluctuation occurs over halftone dots in the halftone processing. When fluctuation in halftone dots have occurred, there may arise dense and sparse parts of halftone dots, which may generate moire.

Figure 8B:
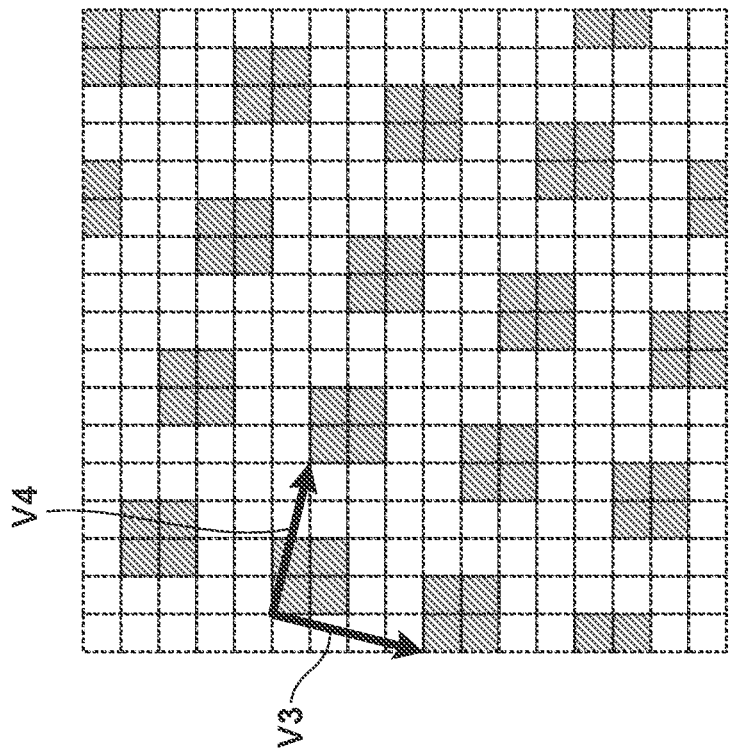
FIGS. 8A and 8B are diagrams illustrating an image formed by halftone processing according to an embodiment.
Figure 8A:
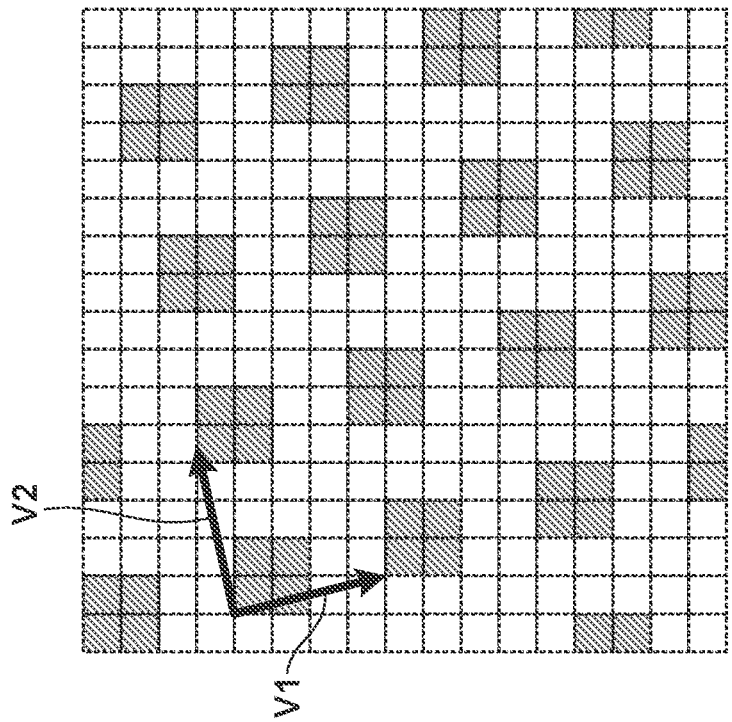

In the following, there will be described a principle of moire generation due to variation of the scanning lines. FIGS. 8A and 8B illustrate an example of an image subjected to halftone processing with a 146-line dither matrix. In FIGS. 8A and 8B, as well as a similar diagram illustrated below, a direction from left side to right side in the drawings corresponds to the main scanning direction, a direction from top side to bottom side in the drawings corresponds to the sub-scanning direction. Therefore, the direction of movement of the scanning beams is from left side to right side in the drawing, and scanning is performed from top side to bottom side in the drawing. In addition, displacement in the main scanning direction and the sub-scanning direction is defined as displacement to "the positive side" and displacement in directions opposite to the main scanning direction and the sub-scanning direction is defined as displacement to the "negative side".

FIGS. 8A and 8B is an enlarged view illustrating a part of an image with a 25% density of the maximum (100%) density. As the density is 25%, toner is adhering to a quarter area of the image (shaded regions in the drawing). In the following description, a region where toner collectively adheres by exposure for continuous pixel pieces, is referred to as a "dot region". In halftone processing, a plurality of start points are arranged, and as the image density increases, the dot regions are enlarged with the plurality of start points being a base. The start points are periodically arranged on a two-dimensional plane. In other words, the start points are periodically arranged in the main scanning direction and the sub-scanning direction. The halftone processing is defined by a vector connecting the start points closest to each other in the sub-scanning direction, and a vector connecting the start points closest to each other in the main scanning direction.

In the halftone processing illustrated in FIG. 8A, the vector connecting the start points closest to each other in the sub-scanning direction is a vector V1, and the vector connecting the start points closest to each other in the main scanning direction is a vector V2. Similarly, in the halftone processing illustrated in FIG. 8B, the vector connecting the start points closest to each other in the sub-scanning direction is a vector V3, and the vector connecting the start points closest to each other in the main scanning direction is a vector V4. The vectors V1, V2, V3 and V4 are respectively represented by coordinates in units of the number of pixels in the main scanning direction and sub-scanning direction as (1, 4), (4, −1), (−1, 4) and (4, 1). In the following description, a direction parallel to the vector V is denoted as the "V direction".

Figure 9:
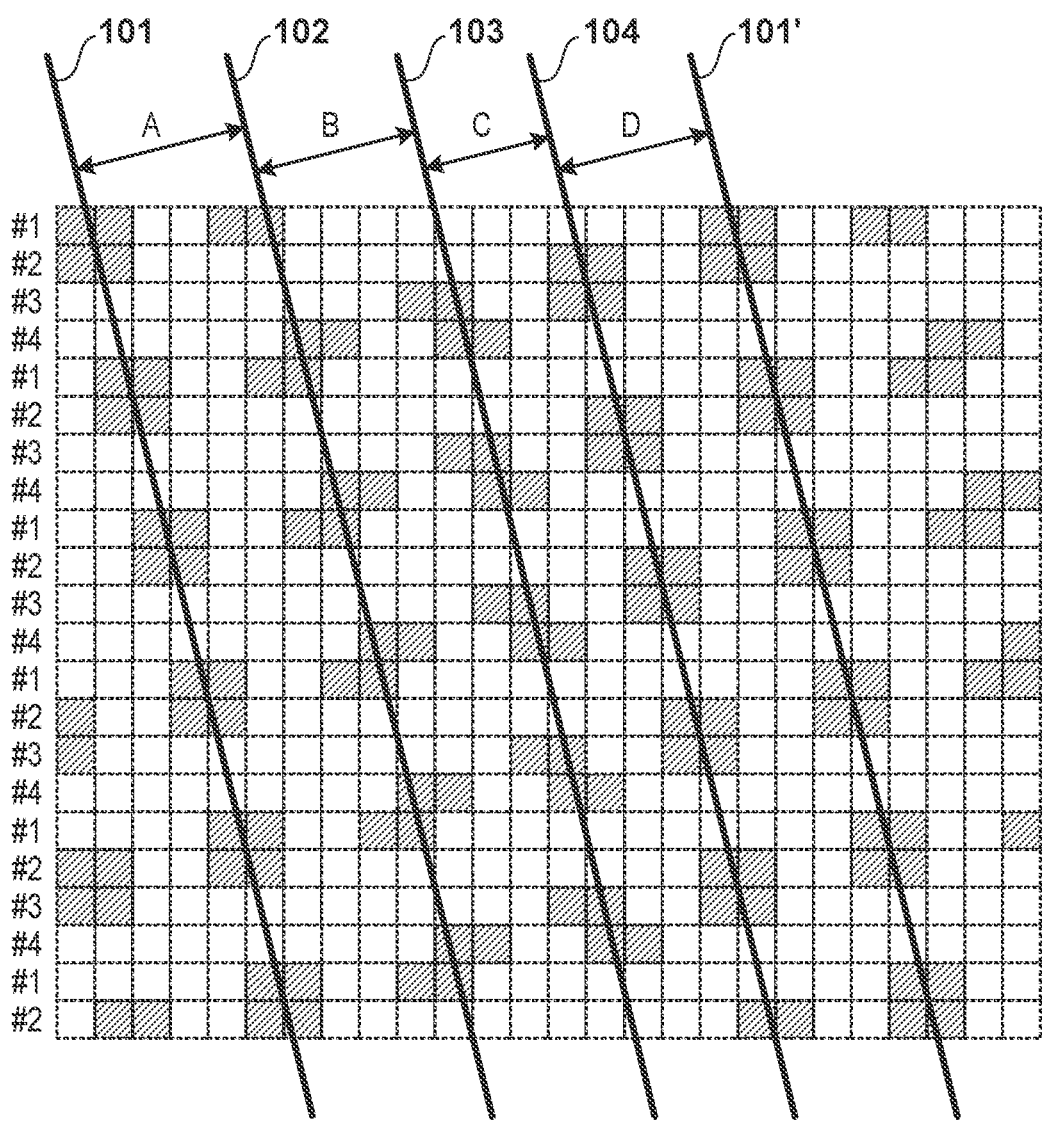
FIG. 9 is an explanatory diagram of the principle of moire generation.

FIG. 9 illustrates a case where the scanning start position of the scanning line #4 is shifted to the right by one pixel in forming the image illustrated in FIG. 8A. Here the numbers on the left side indicate the scanning line numbers. Lines 101, 102, 103, 104 and 101' in FIG. 9 are lines in a V1 direction respectively connecting the centroid positions of each of the dot regions. The dot regions are periodic in the main scanning direction, and the line 101' corresponds to the line 101. Assuming that the scanning start positions of all the scanning lines are aligned, the distances in the V2 direction between two adjacent lines among the lines 101 to 104 are equal. In the following, positions of the lines 101 to 104 are denoted as "reference position" in a case where the scanning start positions of all the scanning lines are aligned, and the distance between adjacent two lines in the V2 direction in that case is denoted as "reference distance".

In the example illustrated in FIG. 9, the scanning start position of the scanning line #4 is shifted to right by one pixel. Therefore, the center of gravity of the dot region, formation of which the scanning line #4 relates to, also shifts to the right side of the drawing. Accordingly, the lines 102 and 103 passing through the dot region, formation of which the scanning line #4 relates to, shift to the right side of the drawing relative to the reference position. On the other hand, the line 101 remains at the reference position. Therefore, the distance A between the lines 101 and 102 in the V2 direction is larger than the reference distance. Both the lines 102 and 103 shift to the right side of the drawing relative to the reference position by a same shift amount, and therefore the distance B between lines 102 and 103 in the V2 direction is equal to the reference distance. On the other hand, the line 104 remains at the reference position and therefore the distance C between the lines 103 and 104 in the V2 direction is smaller than the reference distance. Since the lines 104 and 101' are remaining at the reference position, the distance D between the lines 104 and 101' in the V2 direction remains to be the reference distance. In other words, the aforementioned relation is A>B=D>C, this variation will be repeated in the V2 direction. In addition, the length in the V2 direction periodically varies also in blank regions, other than dot regions, where no toner adheres. This periodic variation may generate moire.

In order to suppress occurrence of moire described referring to FIG. 9, it is necessary to suppress variation of scanning lines. Therefore, when manufacturing the image forming apparatus, variation of scanning lines as illustrated in FIGS. 7A and 7B is measured and correction information for suppressing variation of scanning lines is created based on the measurement result and stored in the memory 402 of the image controller 340. For example, it is assumed that the variation of scanning lines is given as illustrated in FIG. 7A, and the measured value of a value A amounts to as many as four pixel pieces. The correction information in this case is as illustrated in FIG. 10A. FIG. 10A indicates that the start timings of the scanning line #3 and the scanning line #4 is set earlier by 4 pulses of the PWM signal. In this case, the image controller 340, based on the correction information illustrated in FIG. 10A, sets the timing of outputting, to the scanning unit 124, the image signal (PWM signal) for generating the scanning beams 81-3 and 81-4 corresponding to the scanning line #3 and the scanning line #4 earlier by a time corresponding to four pulses. In FIG. 7A, it is not necessary to correct the length of each of the scanning lines and therefore the numbers of insertion or removal are all zero.

Additionally, for example, it is assumed that the variation of scanning lines is given as illustrated in FIG. 7B, and the measured values of a value B and a value C both amount to as many as four pixel pieces. The correction information in this case is as illustrated in FIG. 10B. FIG. 10B indicates that four pixel pieces are inserted into the scanning line #1 and the scanning line #2, and four pixel pieces are removed from the scanning line #3 and the scanning line #4. In this case, the image controller 340 generates a corrected image signal by inserting four pulses (pixel pieces) into the image signal (PWM signal) generated, based on the image data, for the scanning line #1 and the scanning line #2. Similarly, the image controller 340 generates a corrected image signal by removing four pulses (pixel pieces) from the image signal (PWM signal) generated, based on the image data, for the scanning line #3 and the scanning line #4. Here, whether to expose or not to expose the pixel piece to be inserted may be determined based on a predetermined criterion. In addition, the positions at which the pixel pieces are inserted or removes may be distributed on the scanning line. Here, the length of the scanning line can be adjusted by adjusting the clock signal of the image, instead of inserting or removing a pixel piece.

An ideal correction information allows for suppressing variation of scanning lines, whereby it is possible to suppress occurrence of the moire described referring to FIG. 9 due to interference with the halftone processing. However, an error in measurement for generating correction information may leave variation in the scanning lines. When, for example, the four light sources 209-1 to 209-4 as illustrated in FIG. 6A are used, the scanning beams 81-1 to 81-4 are arranged on the photoconductor 122 as illustrated in FIG. 6B by rotating the scanning beams 81-1 to 81-4 emitted from the four light sources 209-1 to 209-4 such that the spacing between the scanning lines in the sub-scanning direction becomes a predetermined value on the photoconductor 122. In this case, the shift amounts of the scanning beams 81-2 to 81-4 relative to the scanning beam 81-1 illustrated in FIG. 6B are measured to create correction information. Here, the spacing between the scanning beams 81-1 to 81-4 in the main scanning direction is substantially equal, and therefore it is possible to calculate respective shift amounts of the scanning beams 81-2 to 81-4 relative to the scanning beam 81-1 by measuring the shift amount of the scanning beam 81-4 relative to the scanning beam 81-1. For example, the measured shift amount of the scanning beam 81-4 relative to the scanning beam 81-1 is now represented by X. In this case, the shift amount of the scanning beams 81-2 relative to the scanning beam 81-1 is determined to be X/3, and the shift amount of the scanning beam 81-3 relative to the scanning beam 81-1 is determined to be 2X/3. In this case, correction information is generated based on these values.

Figure 11A:
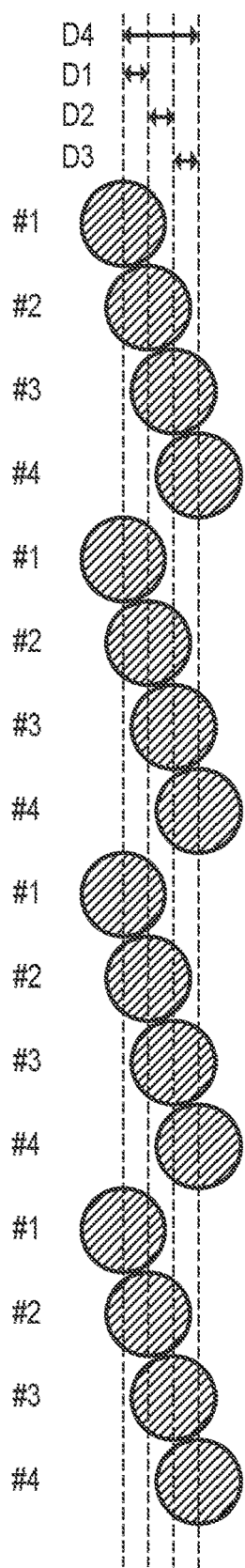
FIGS. 11A and 11B are diagrams illustrating an example of a scanning start positional shift still remaining after correction due to an error in correction information.
Figure 11B:
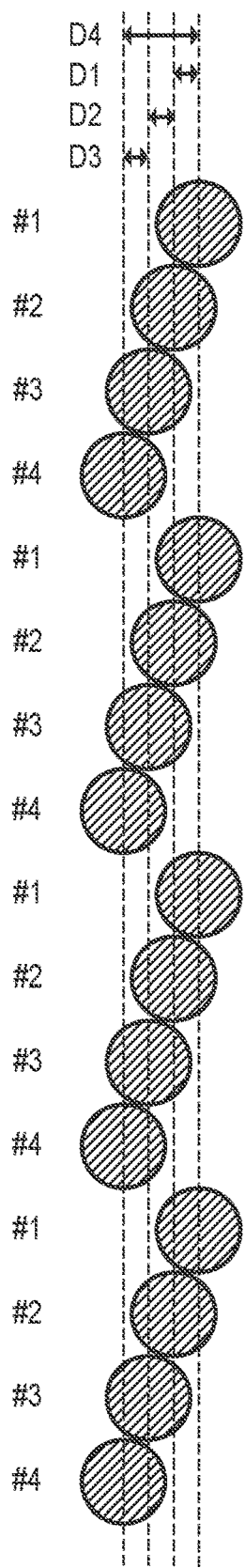

However, when a measurement error exists in the measured value X of the shift amount, scanning start position of each of the actual scanning lines are disordered. The aforementioned situation is illustrated in FIGS. 11A and 11B. It is assumed in FIGS. 11A and 11B that symbols #1 to #4 indicate the number of the scanning lines, each of which is respectively formed by the scanning beams 81-1 to 81-4. FIG. 11A illustrates a case where the measured value X is greater the actual shift amount Y. In this case, excessive correction is performed, and then the scanning start position of the scanning line #k (k being 2 to 4) shifts to the right side of the drawing relative to the scanning line #(k−1), i.e., to the positive side of the main scanning direction. On the other and, FIG. 11B illustrates a case where the measured value X is smaller than the actual shift amount Y. In this case, insufficient correction is performed, and then the scanning start position of the scanning line #k (k is 2 to 4) shifts to the left side of the drawing relative to the scanning line #(k−1), i.e., the negative side of the main scanning direction. As illustrated in FIG. 6B, the spacing between the scanning beams 81-1 to 81-4 in the main scanning direction is substantially equal and the correction amount is also calculated based on the measured value X, and therefore the shift amounts D1 to D3 illustrated in FIG. 11 are substantially equal, and the shift amount D4 is substantially three times the shift amounts D1 to D3. Accordingly, the relative shift amount D4 of the scanning start position of the scanning line #4 and the scanning line #1 is greater than the other relative shift amounts D1 to D3 of the scanning start position of the two adjacent scanning lines, whereby a variation of the scanning lines occurs periodically every four lines (scanning lines) in the sub-scanning direction.

Figure 12A:
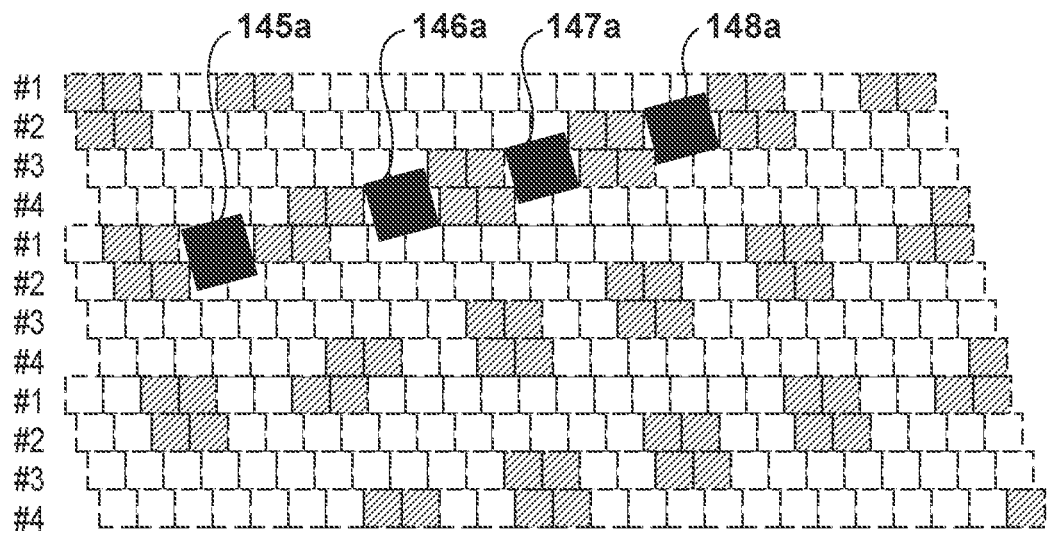
FIGS. 12A and 12B are diagrams explaining that intensity of moire differs depending on halftone processing and the pattern of the scanning start positional shift.
Figure 12B:
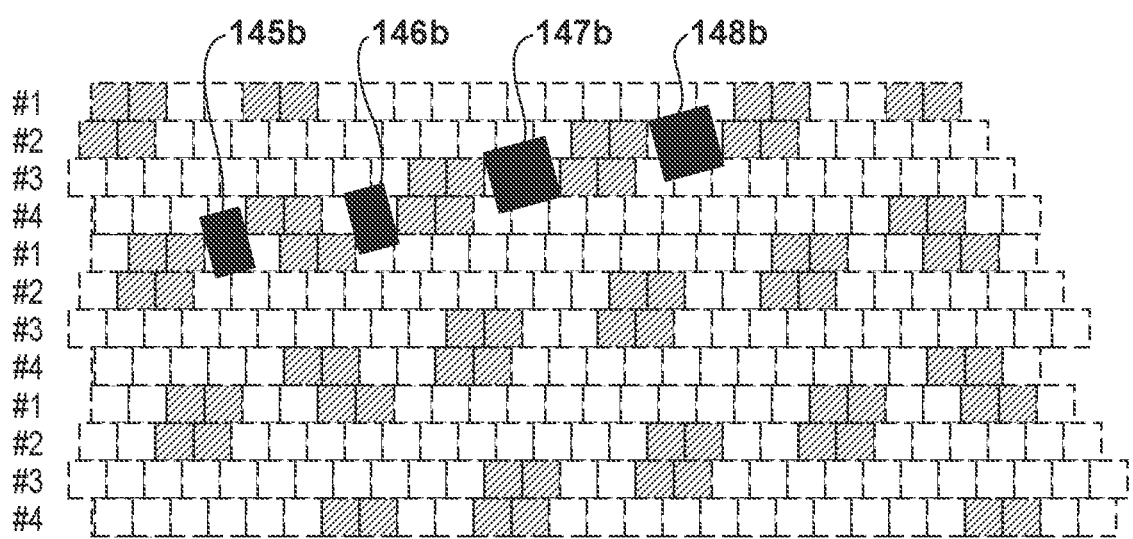

FIGS. 12A and 12B respectively illustrate images actually formed in a case where shifts in the scanning start positions illustrated in FIGS. 11A and 11B have occurred in forming the image illustrated in FIG. 8A. Here, the values of the shift amounts D1 to D4 illustrated in FIG. 11A and the shift amounts D1 to D4 illustrated in FIG. 11B are assumed to be respectively equal.

In FIGS. 12A and 12B, reference numerals 145*a* to 148*a* and 145*b* to 148*b* indicate blank regions between dot regions. The arrangement direction of the blank regions 145*a* to 148*a* and the arrangement direction of the blank regions 145*b* to 148*b* respectively correspond to the V2 direction. In FIG. 12A, the scanning line #1 shifts to the negative side of the main scanning direction by D4=D1+D2+D3 relative to the just above scanning line #4. As illustrated in FIG. 12A, the length of the blank region 145*a* in the V2 direction is determined by the positions of the dot regions of the scanning line #1 and the scanning line #2. The length of the blank region 146*a* in the V2 direction is determined by the positions of the dot regions of the scanning line #3 and the scanning line #4. Furthermore, the length of the blank region 147*a* in the V2 direction is determined by the positions of the dot regions of the scanning line #2 to the scanning line #4. Furthermore, the length of the blank region 148*a* in the V2 direction is determined by the positions of the dot regions of the scanning line #1 to the scanning line #3. As such, the lengths of the blank regions 145*a* to 148*a* in the V2 direction are not defined by the position of the dot region on the scanning line #1 and the position of the dot region on the scanning line #4, and therefore the lengths of the blank regions 145*a* to 148*a* in the V2 direction are substantially equal.

On the other hand, in FIG. 12B, the scanning line #1 shifts to the positive side of the main scanning direction by D4=D1+D2+D3 relative to the just above scanning line #4. As illustrated in FIG. 12B, the length of the blank region 145*b* in the V2 direction is determined by the positions of the dot regions of the scanning line #1 and the scanning line #4. In addition, the length of the blank region 146*b* in the V2 direction is also determined by the positions of the dot regions of the scanning line #1 and the scanning line #4. The length of the blank region 147*b* in the V2 direction is determined by the position of the dot region of the scanning line #3. Furthermore, the length of the blank region 148*b* in the V2 direction is determined by the position of the dot region of the scanning line #2. The scanning line #1 is significantly shifted to the positive side of the main scanning direction relative to the scanning line #4, and therefore the lengths of the blank regions 145*b* and 146*b* in the V2 direction are shorter than the lengths of the blank regions 147*b* and 148*b* in the V2 direction.

In the image illustrated in FIG. 12B, moire is visible due to a periodic variation in the V2 direction of the lengths of the blank regions 145*b* to 148*b* in the V2 direction. On the other hand, moire is hardly visible in the image illustrated in FIG. 12A since the lengths of the blank regions 145*b* to 148*b* in the V2 direction are substantially equal. Therefore, when performing halftone processing with the vectors V1 and V2 illustrated in FIG. 8A, occurrence of a shift in the scanning start position as illustrated in FIG. 11B makes moire more easily visible than in the case where a shift has occurred in the scanning start position as illustrated in FIG. 11A.

Figure 13A:
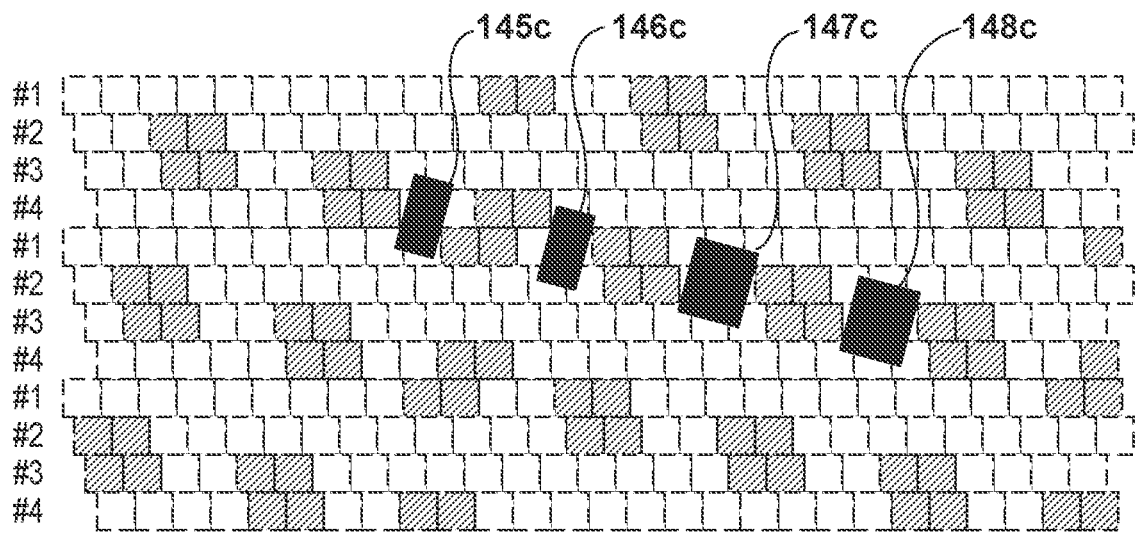
FIGS. 13A and 13B are diagrams explaining that intensity of moire differs depending on halftone processing and the pattern of the scanning start positional shift.
Figure 13B:
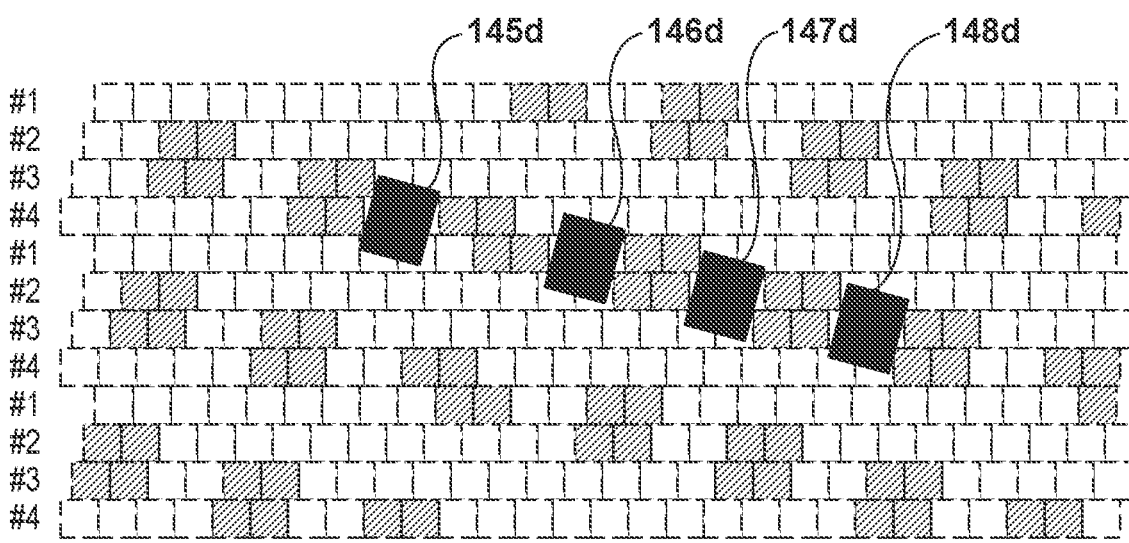

FIGS. 13A and 13B respectively illustrate images actually formed in a case where shifts in the scanning start positions illustrated in FIGS. 11A and 11B have occurred in forming the image illustrated in FIG. 8B. Here, the values of the shift amounts D1 to D4 illustrated in FIG. 11A and the shift amounts D1 to D4 illustrated in FIG. 11B are assumed to be equal.

In FIGS. 13A and 13B, reference numerals 145*c* to 148*c* and 145*d* to 148*d* indicate blank regions between dot regions. The arrangement direction of the blank regions 145*c* to 148*c* and the arrangement direction of the blank regions 145*d* to 148*d* respectively correspond to the V4 direction. In FIG. 13A, the scanning line #1 shifts to the negative side of the main scanning direction by D4=D1+D2+D3 relative to the just above scanning line #4. As illustrated in FIG. 13A, the length of the blank region 145*c* in the V4 direction is determined by the positions of the dot regions of the scanning line #1 and the scanning line #4. In addition, the length of the blank region 146*c* in the V4 direction is also determined by the positions of the dot regions of the scanning line #1 and the scanning line #4. The length of the blank region 147*c* in the V4 direction is determined by the position of the dot region of the scanning line #2. Furthermore, the length of the blank region 148*c* in the V4 direction is determined by the position of the dot region of the scanning line #3. The scanning line #1 is significantly shifted to the negative side of the main scanning direction relative to the scanning line #4, and therefore the lengths of the blank regions 145*c* and 146*c* in the V4 direction is shorter than the lengths of the blank regions 147*c* and 148*c* in the V4 direction.

On the other hand, in FIG. 13B, the scanning line #1 shifts to the positive side of the main scanning direction by D4=D1+D2+D3 relative to the just above scanning line #4.

As illustrated in FIG. 13B, the length of the blank region 145d in the V4 direction is determined by the positions of the dot regions of the scanning line #3 and the scanning line #4. The length of the blank region 146d in the V4 direction is determined by the positions of the dot regions of the scanning line #1 and the scanning line #2. Furthermore, the length of the blank region 147d in the V4 direction is determined by the positions of the dot regions of the scanning line #1 to the scanning line #3. Furthermore, the length of the blank region 148d in the V4 direction is determined by the positions of the dot regions of the scanning line #2 to the scanning line #4. As such, the lengths of the blank regions 145d to 148d in the V4 direction are not defined by the dot region on the scanning line #1 and the dot region on the scanning line #4, and therefore the lengths of the blank regions 145d to 148d in the V4 direction are substantially equal.

In the image illustrated in FIG. 13A, moire is visible due to a periodic variation in the V4 direction of the lengths of the blank regions 145c to 148c in the V4 direction. On the other hand, moire is hardly visible in the image illustrated in FIG. 13B since the lengths of the blank regions 145d to 148d in the V4 direction are substantially equal. Therefore, when performing halftone processing with the vectors V3 and V4 illustrated in FIG. 8B, occurrence of a shift in the scanning start position as illustrated in FIG. 11A makes moire more easily visible than in the case where a shift has occurred in the scanning start position as illustrated in FIG. 11B.

As has been described referring to FIGS. 12A, 12B, 13A and 13B, the intensity of moire differs depending on a combination of the direction of the vector forming a smaller angle with the sub-scanning direction among the two vectors in the halftone processing, and the direction connecting the scanning start position of each of the scanning lines. Specifically, among the two vectors defining the halftone processing, a vector forming a smaller angle with the sub-scanning direction is referred to as a first vector. The first vector in the halftone processing illustrated in FIG. 8A is the vector V1, and the first vector in the halftone processing illustrated in FIG. 8B is the vector V3. In addition, a pattern of the scanning start position, in which the scanning start position is linearly displaced to the positive side of the main scanning direction along the sub-scanning direction as illustrated in FIG. 11A, is denoted as "positive pattern". Conversely, a pattern of the scanning start position, in which the scanning start position is linearly displaced to the negative side of the main scanning direction along the sub-scanning direction as illustrated in FIG. 11B, is denoted as "negative pattern". When the direction of the first vector is directed toward the positive side of the main scanning direction along the sub-scanning direction, setting the scanning start position to "positive pattern" makes moire hardly visible, whereas setting the scanning start position to "negative pattern" makes moire easily visible. When, on the other hand, the first vector is directed toward the negative side of the main scanning direction along the sub-scanning direction, setting the scanning start position to "positive pattern" makes moire easily visible, whereas setting the scanning start position to "negative pattern" makes moire hardly visible.

Therefore, the present embodiment sets the correction information such that the pattern of the scanning start position is either "positive pattern" or "negative pattern", depending on the direction of the first vector in the halftone processing. In other words, correction information is set such that the straight line connecting the scanning start position of each of the scanning lines is in a direction intersecting the sub-scanning direction depending on the direction of the first vector, not in parallel to the sub-scanning direction. FIG. 14C illustrates a relation between the value of D4 illustrated in FIG. 11A and the intensity of moire. Here, the solid line indicates the case of using the halftone processing illustrated in FIG. 8A, and the dotted line indicates the case of using the halftone processing illustrated in FIG. 8B. According to FIG. 14C, when the halftone processing illustrated in FIG. 8A is used, moire is invisible for values of D4 in a range of 0 to DT1. Here, DT1 is a positive value. In addition, according to FIG. 14C, when the halftone processing illustrated in FIG. 8B is used, moire is invisible for values of D4 in a range of DT2 to 0. Here, DT2 is a negative value.

Figure 14A:
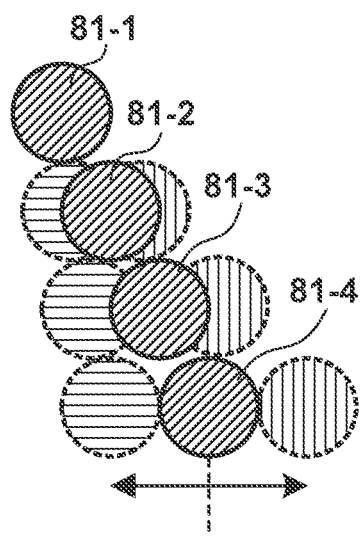
FIGS. 14A and 14B are diagrams illustrating a relation between halftone processing and target scanning start positions.

Therefore, the present embodiment sets the correction information such that, when using the halftone processing illustrated in FIG. 8A, the scanning start position of each of the scanning beams 81-1 to 81-4 is arranged as indicated by solid-line circles illustrated in FIG. 14A. In FIG. 14A, the correction information is set such that the scanning start position of the scanning beam 81-4 is displaced to the positive side of the main scanning direction by |DT1/2| relative to the scanning start position of the scanning beam 81-1. In other words, the correction information is set to the median of the range 0 to DT1 that is the range of D4 illustrated in FIG. 14C in which moire is invisible. Therefore, the scanning start position of the scanning beam 81-2 is set to be displaced to the positive side of the main scanning direction by |DT1/6| relative to the scanning start position of the scanning beam 81-1. In addition, the scanning start position of the scanning beam 81-3 is set to be displaced to the positive side of the main scanning direction by |DT1/3| relative to the scanning start position of the scanning beam 81-1. The aforementioned configuration prevents moire from being visible even when measurement error has caused the scanning start position to shift to the position indicated by dotted-line circles illustrated in FIG. 14A.

Figure 14B:
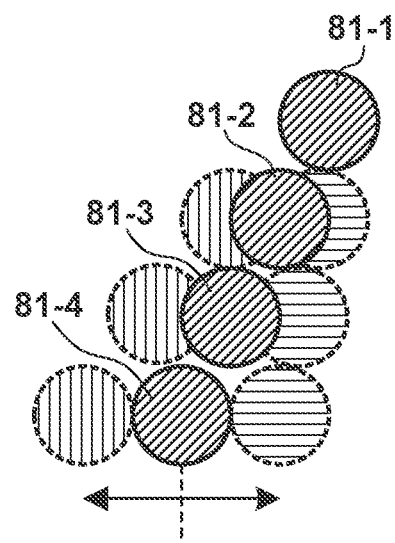
Figure 14C:
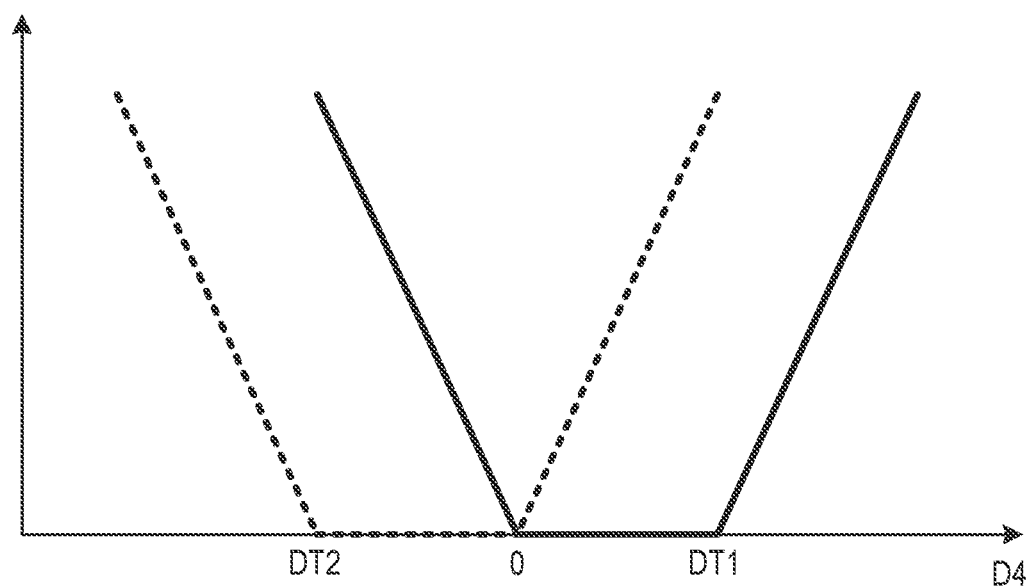
FIG. 14C is a diagram illustrating a relation between a shift amount of the scanning start positions and intensity of moire.

Similarly, when using the halftone processing illustrated in FIG. 8B, the correction information is set such that the scanning start position of each of the scanning beams 81-1 to 81-4 is arranged as indicated by the solid-line circles illustrated in FIG. 14B. In FIG. 14B, the correction information is set such that the scanning start position of the scanning beam 81-4 is displaced to the negative side of the main scanning direction by |DT2/2| relative to the scanning start position of the scanning beam 81-1. In other words, the correction information is set to the median of the range DT2 to 0 that is the range of D4 illustrated in FIG. 14C in which moire is invisible. Therefore, the scanning start position of the scanning beam 81-2 is set to be displaced to the negative side of the main scanning direction by |DT2/6| relative to the scanning start position of the scanning beam 81-1. Furthermore, the scanning start position of the scanning beam 81-3 is set to be displaced to the negative side of the main scanning direction by |DT2/3| relative to the scanning start position of the scanning beam 81-1. The aforementioned configuration prevents moire from being visible even when measurement error has caused the scanning start position to shift to the position indicated by the dotted-line circles illustrated in FIG. 14B. Specific values of DT1 and DT2 may vary, depending on the number of screen lines in the halftone processing. Therefore, the amount of displacement of the scanning start position of the scanning beam 81-4 relative to the scanning start position of the scanning beam 81-1, which is set in the correction information, is determined based on the number of screen lines in the halftone processing.

As has been described above, in the present embodiment, the correction information is set such that the scanning start position of each of N scanning lines is linearly displaced to the positive side or negative side of the main scanning direction along the sub-scanning direction when a variation of scanning lines occurs in a period of the N scanning lines (N is an integer equal to or larger than 2) in the sub-scanning direction. Here, the direction of the line is determined based on the direction of the vector forming a smaller angle with respect to the sub-scanning direction among the two vectors in the halftone processing used. The aforementioned configuration can make moire hardly visible.

Although the present embodiment has been described with regard to the shift of positions of the scanning lines in the main scanning direction, the invention is also applicable in a case where a shift occurs in the spacing between the scanning lines in the sub-scanning direction.

Second Embodiment

The following describes a second embodiment mainly about differences from the first embodiment. FIGS. 15A and 15B illustrate an example of an image subjected to halftone processing using a 134-line dither matrix. FIGS. 15A and 15B is an enlarged view illustrating a part of an image with a 25% density of the maximum density (100%). The two vectors defined in the halftone processing illustrated in FIG. 15A are a vector V5 and a vector V6, and the two vectors defined in the halftone processing illustrated in FIG. 15B are a vector V7 and a vector V8. Here, the vectors V5 to V8 are respectively represented by coordinates similar to that in the first embodiment as (2, 4), (4, −2), (−2, 4) and (4, 2).

Figure 16A:
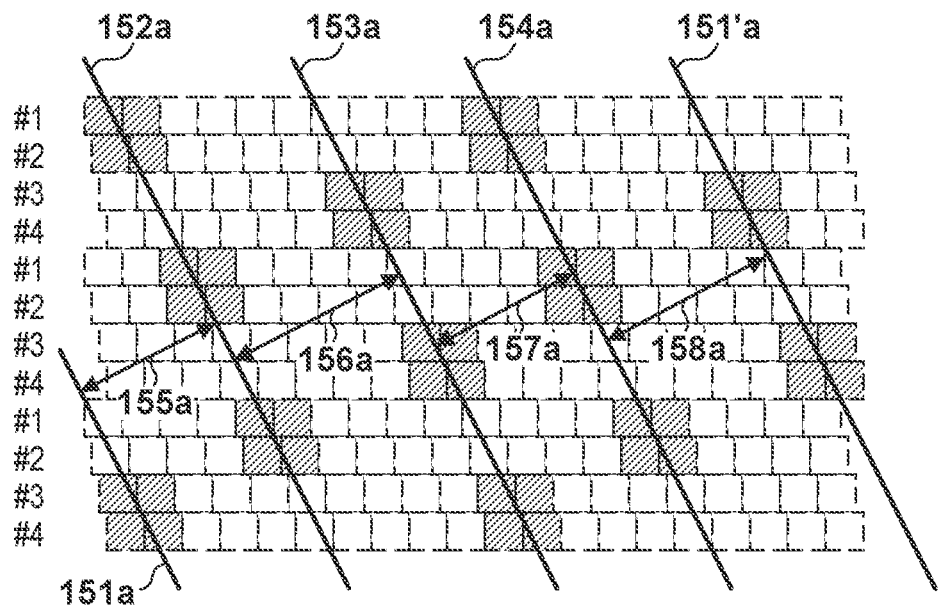
FIGS. 16A and 16B are diagrams explaining that the intensity of moire differs depending on halftone processing and the pattern of scanning start positional shift.
Figure 16B:
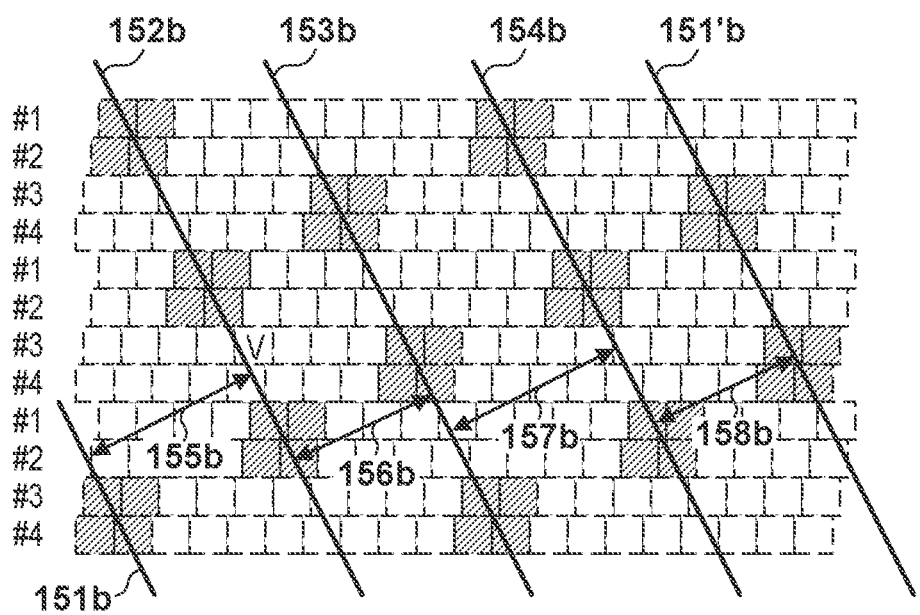

FIGS. 16A and 16B respectively illustrate images actually formed in a case where shifts in the scanning start positions illustrated in FIGS. 11A and 11B have occurred in forming the image illustrated in FIG. 15A. Here, the values of the shift amounts D1 to D4 illustrated in FIG. 11A and the shift amounts D1 to D4 illustrated in FIG. 11B are assumed to be equal. Lines 151a, 152a, 153a, 154a and 151'a in FIG. 16A are lines in the V5 direction respectively connecting the centroid positions of each of the dot regions. The dot regions are periodic in the main scanning direction, and the line 151'a corresponds to the line 151a. Reference numerals 151b, 152b, 153b, 154b and 151'b in FIG. 16B are lines in the V5 direction respectively connecting the centroid positions of each of the dot regions. The dot regions are periodic in the main scanning direction, and the line 151'b corresponds to the line 151b. In addition, similarly to the description provided in FIG. 9, positions of the lines are denoted as "reference positions" in a case where the scanning start positions of all the scanning lines are aligned, and the distance between adjacent two lines in the V6 direction in that case is denoted as "reference distance".

In FIG. 16A, the lines 152a and 154a connect dot regions formed only by the scanning line #1 and the scanning line #2. Therefore, these lines move from the reference position to the positive side of the main scanning direction by D1/λ=0.5D1 corresponding to the mean of the shift amount (whose value is 0) of the scanning line #1 and the shift amount D1 of the scanning line #2. On the other hand, the lines 151a, 153a and 151'a connect dot regions formed only by the scanning line #3 and the scanning line #4. Therefore, these lines move from the reference position to the positive side of the main scanning direction by D1+D2+D3/2 corresponding to the mean of the shift amount D1+D2 of the scanning line #3 and the shift amount D1+D2+D3 of the scanning line #4. D1 D2 D3 holds as described above. And thus, when D1=D2=D3 is assumed to hold, the lines 151a, 153a and 151'a move from the reference position to the positive side of the main scanning direction by 2.5 D1. Therefore, the distance 155a between the lines 151a and 152a in the V6 direction and the distance 157a between the lines 153a and 154a in the V6 direction is smaller than the reference distance by 2D1. On the other hand, the distance 156a between the lines 152a and 153a in the V6 direction and the distance 158a between the lines 154a and 151'a in the V6 direction is larger than the reference distance by 2D1. As such, the distance between dot regions in the V6 direction periodically varies in the image illustrated in FIG. 16A, making moire easily visible.

In FIG. 16B, the lines 152b and 154b connect dot regions formed only by the scanning line #1 and the scanning line #2. In addition, the lines 151b, 153b and 151'b connect dot regions formed only by the scanning line #3 and the scanning line #4. Therefore, the distance between each of the lines in the V6 direction periodically varies, as with FIG. 16A. Therefore, the distance between dot regions in the V6 direction periodically varies, making moire easily visible in the image illustrated in FIG. 16B. However, since the shift direction of the scanning line is opposite to the direction illustrated in FIG. 16A, the distance 155b between the lines 151b and 152b in the V6 direction, and the distance 157b between the lines 153b and 154b in the V6 direction are larger than the reference distance. And, the distance 156b between the lines 152b and 153b in the V6 direction, and the distance 158b between the lines 154b and 151'b in the V6 direction is smaller than the reference distance.

Figure 17A:
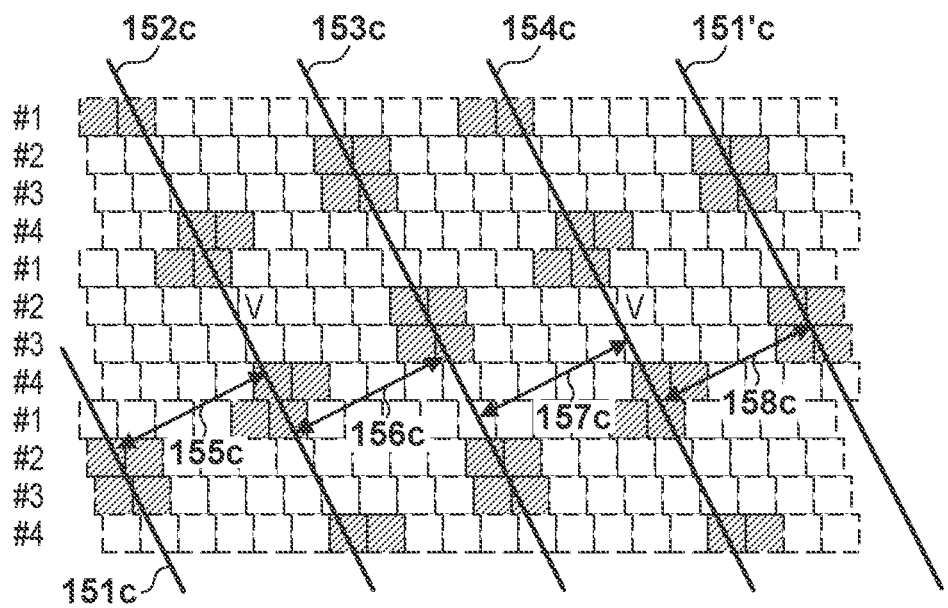
FIGS. 17A and 17B are diagrams explaining that the intensity of moire differs depending on halftone processing and the pattern of scanning start positional shift.

FIG. 17A illustrates, as with FIG. 16A, an image actually formed in a case where a shift in the scanning start positions illustrated in FIG. 11A has occurred in forming the image illustrated in FIG. 15A. In FIG. 17A, however, the positions of the start points in the halftone processing are moved upward side in the drawing by one scanning line relative to the halftone processing illustrated in FIG. 16A. In other words, the phase of the periodic halftone processing in the sub-scanning direction is shifted upward side in the drawing by a value corresponding to one pixel.

In FIG. 17A, the lines 152c and 154c connect dot regions formed only by the scanning line #1 and the scanning line #4. Therefore, these lines move from the reference position to the positive side of the main scanning direction by (D1+D2+D3)/2 corresponding to the mean of the shift amount (whose value is 0) of the scanning line #1 and the shift amount D1+D2+D3 of the scanning line #4. On the other hand, the lines 151c, 153c and 151'c connect dot regions formed only by the scanning line #2 and the scanning line #3. Therefore, these lines move from the reference position to the positive side of the main scanning direction by D1+D2/2 corresponding to the mean of the shift amount D1 of the scanning line #2 and the shift amount D1+D2 of the scanning line #3. D1 D2 D3 holds. And thus, when D1=D2=D3 is assumed to hold, the amount of movement of the lines 152c and 154c from the reference position is 1.5D1, and the amount of movement of the lines 151c, 153c and 151'c from the reference position is also 1.5D1. As such, all the lines 151c to 154c and 151'c shift to the positive side of the main scanning direction by 1.5D1, and therefore the distance between each of the lines in the V6 direction is equal. Therefore, moire is hardly visible in the image illustrated in FIG. 17A.

Figure 17B:
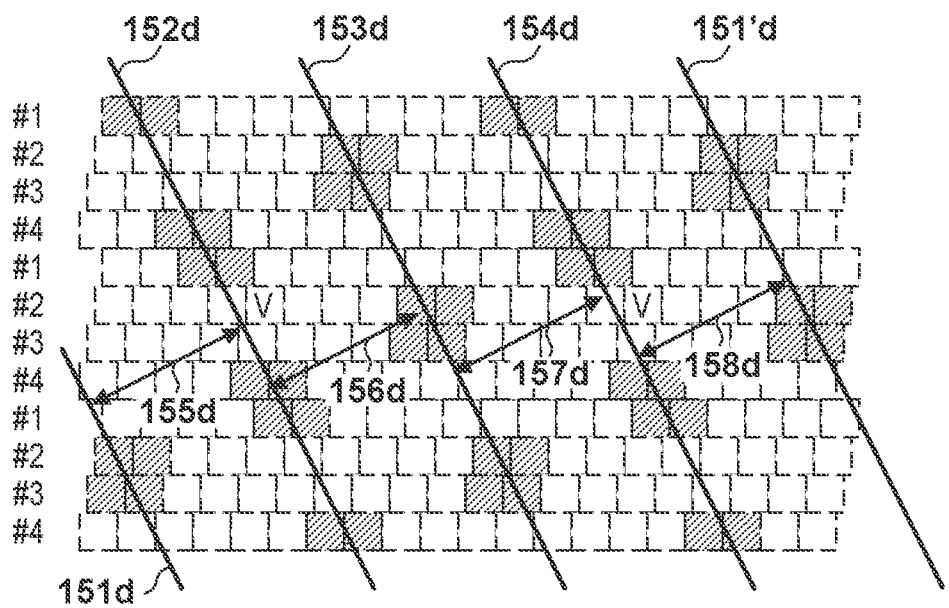

FIG. 17B illustrates, as with FIG. 16B, an image actually formed in a case where a shift in the scanning start positions illustrated in FIG. 11B has occurred in forming the image illustrated in FIG. 15A. In FIG. 17B, however, the positions of the start points in the halftone processing are moved upward side in the drawing by one scanning line relative to the halftone processing illustrated in FIG. 16B. In FIG. 17B, the lines 152d and 154d connect dot regions formed only by the scanning line #1 and the scanning line #4. In addition, the lines 151d, 153d and 151'd connect dot regions formed only by the scanning line #2 and the scanning line #3. Therefore, the distances 155d to 158d between respective lines in the V6 direction are substantially equal, and therefore moire is hardly visible, as with the image illustrated in FIG. 17A. Here, adjusting the phase in the sub-scanning direction in the halftone processing allows for making moire hardly visible similarly for the halftone processing illustrated in FIG. 14B.

As such, when the scanning start positions of N scanning lines (N is an integer equal to or larger than 2) are repeatedly displaced in the main scanning direction along the sub-scanning direction, the relative shift amount in the main scanning direction between the last scanning line at the last of the N scanning lines and the start scanning line at the first of the next N scanning lines is larger than the relative shift amount in the main scanning direction between two other scanning lines adjacent to each other. In this case, it is possible to make moire hardly visible by setting the phase of the halftone processing in the sub-scanning direction such that the last scanning line and the start scanning line form a same dot region. Here, a dot region corresponds to an exposure region of the photoconductor 122. Therefore, in other words, it is possible to make moire hardly visible by setting the phase of the halftone processing in the sub-scanning direction such that the last scanning line and the start scanning line expose exposure regions having the same start point in the halftone processing. For example, in FIGS. 17A and 17B, the last scanning line is the scanning line #4, and the start scanning line is the scanning line #1. In FIGS. 17A and 17B, the scanning line #1 and the scanning line #4 form a same dot region. Here, as has been described in the first embodiment, a configuration may also be used in which, for example, the scanning start positions of the N scanning lines are set, according to the correction information, to be linearly displaced in the main scanning direction along the sub-scanning direction.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-024020, filed Feb. 18, 2022, which is hereby incorporated by reference herein in its entirety.

What is claimed is:

1. An image forming apparatus comprising:
a photoconductor;
a scanning unit, including a mirror, configured to form an electrostatic latent image on the photoconductor by scanning the photoconductor with one or more scanning beams in a main scanning direction based on an image signal, repetitively in a sub-scanning direction perpendicular to the main scanning direction; and
an image controller, including a memory, configured to perform halftone processing on image data to generate the image signal,
wherein the memory stores correction information for correcting a scanning start position of the one or more scanning beams for the photoconductor,
wherein the image controller sets the correction information so that scanning start positions of a plurality of scanning lines that are successive in the sub-scanning direction formed on the photoconductor by the one or more scanning beams are linearly displaced to either a negative side or a positive side of the main scanning direction along the sub-scanning direction, in accordance with a direction of a first vector forming a smaller angle with the sub-scanning direction among two vectors in the halftone processing.

2. The image forming apparatus according to claim 1, wherein, in a state where the direction of the first vector is displaced to a positive side of the main scanning direction along the sub-scanning direction, the correction information is set so that the scanning start positions of the plurality of scanning lines that are successive are linearly displaced to the positive side of the main scanning direction along the sub-scanning direction.

3. The image forming apparatus according to claim 1, wherein, in a state the direction of the first vector is displaced to a negative side of the main scanning direction along the sub-scanning direction, the correction information is set so that the scanning start positions of the plurality of scanning lines that are successive are linearly displaced to the negative side of the main scanning direction along the sub-scanning direction.

4. The image forming apparatus according to claim 1, wherein an amount of displacement of the scanning start positions of the plurality of scanning lines that are successive is determined in accordance with a number of screen lines in the halftone processing.

5. The image forming apparatus according to claim 1, wherein:
the one or more scanning beams is a single scanning beam, the mirror is a rotating polygonal mirror that reflects the single scanning beam, and a number of the plurality of scanning lines that are successive is equal to a number of reflecting surfaces of the rotating polygonal mirror.

6. The image forming apparatus according to claim 1, wherein:

the one or more scanning beams are a plurality of scanning beams, and a number of the plurality of scanning lines that are successive is equal to a number of the plurality of scanning beams.

7. The image forming apparatus according to claim 1, wherein:

the one or more scanning beams are a plurality of scanning beams, the mirror is a rotating polygonal mirror that reflects the plurality of scanning beams, and a number of the plurality of scanning lines that are successive is equal to a number calculated by multiplying a number of reflecting surfaces of the rotating polygonal mirror that reflects the plurality of scanning beams with a number of the plurality of scanning beams.

* * * * *